(12) United States Patent
Kim et al.

(10) Patent No.: US 12,522,720 B2
(45) Date of Patent: Jan. 13, 2026

(54) MODIFIED CONJUGATED DIENE-BASED POLYMER, METHOD FOR PREPARING THE SAME AND RUBBER COMPOSITION INCLUDING THE SAME

(71) Applicant: LG Chem, Ltd., Seoul (KR)

(72) Inventors: Hyun Jun Kim, Daejeon (KR); Ro Mi Lee, Daejeon (KR); Min Sik Mun, Daejeon (KR); No Ma Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 684 days.

(21) Appl. No.: 17/438,591

(22) PCT Filed: Sep. 29, 2020

(86) PCT No.: PCT/KR2020/013373
§ 371 (c)(1),
(2) Date: Sep. 13, 2021

(87) PCT Pub. No.: WO2021/066543
PCT Pub. Date: Apr. 8, 2021

(65) Prior Publication Data
US 2022/0127438 A1    Apr. 28, 2022

(30) Foreign Application Priority Data

Sep. 30, 2019 (KR) .......... 10-2019-0121197

(51) Int. Cl.
C08L 15/00 (2006.01)
C08C 19/22 (2006.01)
C08C 19/25 (2006.01)

(52) U.S. Cl.
CPC ............. C08L 15/00 (2013.01); C08C 19/22 (2013.01); C08C 19/25 (2013.01)

(58) Field of Classification Search
CPC .................. C08C 19/25; C08C 19/22
See application file for complete search history.

(56) References Cited

U.S. PATENT DOCUMENTS

| | | | |
|---|---|---|---|
| 4,397,994 | A | 8/1983 | Takeuchi et al. |
| 7,781,533 | B2 | 8/2010 | Ozawa et al. |
| 8,642,705 | B2 | 2/2014 | Ozawa et al. |
| 9,527,932 | B2 | 12/2016 | Morita et al. |
| 2005/0070672 | A1 | 3/2005 | Ozawa et al. |
| 2009/0203843 | A1 | 8/2009 | Fukuoka et al. |
| 2010/0280173 | A1 | 11/2010 | Ozawa et al. |
| 2013/0023624 | A1 | 1/2013 | Sekikawa et al. |
| 2014/0309363 | A1 | 10/2014 | Morita et al. |
| 2015/0307641 | A1 | 10/2015 | Bilbao et al. |
| 2016/0096909 | A1 | 4/2016 | Sekikawa et al. |
| 2016/0229992 | A1 | 8/2016 | Peters et al. |
| 2018/0037674 | A1 | 2/2018 | Yamada et al. |
| 2018/0305470 | A1 | 10/2018 | Lee et al. |
| 2019/0153124 | A1 | 5/2019 | Seo et al. |
| 2019/0203021 | A1 | 7/2019 | Kyo et al. |

FOREIGN PATENT DOCUMENTS

| | | |
|---|---|---|
| CN | 1592760 A | 3/2005 |
| CN | 106103507 A | 11/2016 |
| JP | 2009227858 A | 10/2009 |
| JP | 2012107141 A | 6/2012 |
| JP | 2014159579 A | 9/2014 |
| JP | 2014201692 A | 10/2014 |
| JP | 2015218284 A | 12/2015 |
| JP | 2016079217 A | 5/2016 |
| JP | 2017512890 A | 5/2017 |
| JP | 2018095842 A | 6/2018 |
| KR | 20090008478 A | 1/2009 |
| KR | 20140127773 A | 11/2014 |
| KR | 20160003601 A | 1/2016 |
| KR | 20170076295 A | 7/2017 |
| KR | 20180018175 A | 2/2018 |
| RU | 2641751 C2 | 1/2018 |
| WO | 03046020 A1 | 6/2003 |
| WO | 2008013090 A1 | 1/2008 |
| WO | 2013031852 A1 | 3/2013 |
| WO | 2016133202 A1 | 8/2016 |
| WO | 2017111463 A1 | 6/2017 |
| WO | 2018034217 A1 | 2/2018 |

OTHER PUBLICATIONS

Machine translation of JP2015218284 (Year: 2015).*
Extended European Search Report for Application No. 20872699.2 dated Mar. 30, 2022. 7 pgs.
International Search Report for Application No. PCT/KR2020/013373, dated Jan. 14, 2021, 3 pages.
Third Party Observation for Application No. EP20872699.2 dated Oct. 29, 2024, pp. 1-35.
Declaration of Dr Stefan Schulze, Feb. 19, 2024, pp. 1-7.

* cited by examiner

*Primary Examiner* — Wenwen Cai
(74) *Attorney, Agent, or Firm* — Lerner David LLP

(57) ABSTRACT

The present invention relates to a modified conjugated diene-based polymer and a rubber composition including the same, and relates to a modified conjugated diene-based polymer which may have a mooney large relaxation area of 1500 MU-s or more, and has a high molecular weight and low mooney viscosity after being compounded into a rubber composition, and accordingly, has excellent processability during manufacturing a tire, good physical properties such as tensile properties, and excellent viscoelasticity properties, a method for preparing the same and a rubber composition including the same.

17 Claims, No Drawings

MODIFIED CONJUGATED DIENE-BASED POLYMER, METHOD FOR PREPARING THE SAME AND RUBBER COMPOSITION INCLUDING THE SAME

CROSS-REFERENCE TO RELATED APPLICATIONS

The present application is a national phase entry under 35 U.S.C. § 371 of International Application No. PCT/KR2020/013373 filed Sep. 29, 2020, which claims the priority from Korean Patent Application No. 10-2019-0121197, filed Sep. 30, 2019, all of which are incorporated herein by reference.

TECHNICAL FIELD

The present invention relates to a modified conjugated diene-based polymer which has excellent processability and good tensile strength and viscoelasticity properties, and a rubber composition including the same.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rotation resistance of tires, there is a method of reducing hysteresis loss of vulcanized rubber, and rebound resilience at 50° C. to 80° C., tan 5, Goodrich heating, or the like is used as an evaluation index of the vulcanized rubber. That is, it is desirable to use a rubber material having high rebound resilience at the above temperature or a low tan 5 value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as running resistance and braking force, required for tires may be controlled, and fuel consumption may be reduced by appropriately adjusting the glass transition temperature. The solution-polymerized SBR is prepared by using an anionic polymerization initiator and is being used by coupling or modifying the chain terminals of the polymer thus formed using various modifiers. For example, U.S. Pat. No. 4,397,994 discloses a method of coupling active anions of the chain terminals of a polymer obtained by polymerizing styrene-butadiene using alkyl-lithium which is a monofunctional initiator in a non-polar solvent, using a coupling agent such as a tin compound.

Meanwhile, the polymerization of SBR or BR may be conducted by batch-type or continuous-type polymerization. According to the batch-type polymerization, the polymer thus prepared has narrow molecular weight distribution and merits in view of the improvement of physical properties, but there are problems with low productivity and deteriorated processability. According to the continuous-type polymerization, polymerization is continuously carried out and there are merits in view of excellent productivity and the improvement of processability, but there are problems with wide molecular weight distribution and inferior physical properties. Therefore, research on improving productivity, processability and physical properties at the same time during preparing SBR or BR is continuously required.

PRIOR ART DOCUMENT (Patent Document 1) U.S. Pat. No. 4,397,994 A

DISCLOSURE OF THE INVENTION

Technical Problem

The present invention has been devised to solve the above-mentioned problems of the conventional technique, and an object of the present invention is to provide a modified conjugated diene-based polymer having a high molecular weight and a controlled mooney large relaxation area, and after being compounded into a rubber composition, having low mooney viscosity and excellent processability during manufacturing a tire, good physical properties such as tensile properties, and excellent viscoelasticity, a method for preparing the same and a rubber composition including the same.

Technical Solution

To solve the above-described tasks, according to an embodiment of the present invention, the present invention provides a modified conjugated diene-based polymer having a mooney large relaxation area (MLRA) measured at 100° C. and represented by the following Mathematical Formula 1 of 1500 MU-s or more:

$$A = \frac{k}{(a+1)}[t_f^{(a+1)} - t_o^{(a+1)}] \quad \text{[Mathematical Formula 1]}$$

in Mathematical Formula 1,
A is a mooney large relaxation area (MLRA),
k is a mooney intercept after 1 second from stopping operation of a rotor of a mooney viscometer,
a is a mooney relaxation ratio,
$t_o$ is an initiation point of mooney relaxation, and
$t_f$ is a finishing point of mooney relaxation.

In addition, the present invention provides a method for preparing a modified conjugated diene-based polymer, including: polymerizing a conjugated diene-based monomer, or an aromatic vinyl-based monomer and a conjugated diene-based monomer in the presence of a polymerization initiator in a hydrocarbon solvent to prepare an active polymer (S1); and reacting or coupling the active polymer prepared in step (S1) with a first modifier and a second modifier (S2), wherein the first modifier is an aminoalkoxysilane-based modifier, and the second modifier is an epoxy-based modifier.

In addition, the present invention provides a rubber composition including the modified conjugated diene-based polymer and a filler.

Advantageous Effects

The modified conjugated diene-based polymer according to the present invention has a mooney large relaxation area of 1500 MU-s or more and a high molecular weight but may have low mooney viscosity after being compounded into a rubber composition, and accordingly, has excellent processability, and good tensile properties and viscoelasticity.

In addition, the modified conjugated diene-based polymer according to the present invention includes functional groups derived from two types of modifiers in at least one terminal thereof, thereby further improving tensile properties and viscoelasticity properties.

In addition, the method for preparing a modified conjugated diene-based polymer according to the present invention includes a step of reacting or coupling an active polymer together with a first modifier and a second modifier, and the modified conjugated diene-based polymer which has a controlled mooney large relaxation area to the above-described range, includes functional groups derived from first and second modifiers in a molecule and has excellent processability, tensile properties and viscoelasticity properties may be easily prepared.

Also, the rubber composition according to the present invention includes the modified conjugated diene-based polymer having the above-described mooney large relaxation area, and a molded product having excellent processability, tensile properties and viscoelasticity properties may be manufactured.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

Definition of Terms

The term "mooney large relaxation area (MLRA)" used in the present invention is a measured value (measure) of chain relaxation in a molten polymer, and may indicate that longer or more branched polymer chain may store more energy and require longer time for relaxation after removing applied deformation. For example, the mooney large relaxation area of an ultrahigh molecular weight or long chain branched polymer may be greater than a polymer having a broader or narrower molecular weight when compared with a polymer having the same mooney viscosity.

The term "substituted" used in the present invention may mean the hydrogen of a functional group, an atomic group or a compound is substituted with a specific substituent. If the hydrogen of a functional group, an atomic group or a compound is substituted with a specific substituent, one or a plurality including two or more of substituents may be present according to the number of hydrogen present in the functional group, the atomic group or the compound, and if a plurality of substituents are present, each substituent may be the same or different.

The term "alkyl group" in the present invention may mean monovalent aliphatic saturated hydrocarbon, and may include a linear alkyl group such as methyl, ethyl, propyl and butyl; a branched alkyl group such as isopropyl, sec-butyl, tert-butyl and neo-pentyl; and a cyclic saturated hydrocarbon, or a cyclic unsaturated hydrocarbon group including one or two or more unsaturated bonds.

The term "alkylene group" used in the present invention may mean divalent aliphatic saturated hydrocarbon such as methylene, ethylene, propylene and butylene.

The term "cycloalkyl group" used in the present invention may mean cyclic saturated hydrocarbon.

The term "aryl group" used in the present invention may mean cyclic aromatic hydrocarbon, and may include both monocyclic aromatic hydrocarbon in which one ring is formed, and polycyclic aromatic hydrocarbon in which two or more rings are bonded.

The term "heterocyclic group" used in the present invention is a cyclic saturated hydrocarbon or a cyclic unsaturated hydrocarbon including one or more unsaturated bonds, wherein carbon atoms in the hydrocarbon may be substituted with one or more heteroatoms, and the heteroatom may be selected from N, O and S.

The term "monovalent hydrocarbon group" used in the present invention represents a monovalent substituent derived from a hydrocarbon group, and may mean a monovalent atomic group in which carbon and hydrogen are bonded, such as an alkyl group, an alkenyl group, an alkynyl group, a cycloalkyl group, a cycloalkyl group including one or more unsaturated bonds, and an aryl group, and the monovalent atomic group may have a linear or branched structure according to the structure of the bond thereof.

The term "divalent hydrocarbon group" used in the present invention represents a divalent substituent derived from a hydrocarbon group, and may mean a divalent atomic group in which carbon and hydrogen are bonded, such as an alkylene group, an alkenylene group, an alkynylene group, a cycloalkylene group, a cycloalkylene group including one or more unsaturated bonds, and an arylene group, and the divalent atomic group may have a linear or branched structure according to the structure of the bond thereof.

The term "single bond" used in the present invention may mean a single covalent bond itself excluding a separate atomic or molecular group.

The term "derived unit" and "derived functional group" used in the present invention may represent a component or a structure comes from a certain material, or the material itself.

[Measurement Method and Conditions]

In the present disclosure, "weight average molecular weight (Mw)", "number average molecular weight (Mn)", and "molecular weight distribution (MWD)" are measured through gel permeation chromatography (GPC) analysis and are measured by checking a molecular weight distribution curve. The molecular weight distribution (PDI, MWD, Mw/Mn) is calculated from each molecular weight measured. Particularly, the GPC uses two columns of PLgel Olexis (Polymer laboratories Co.) and one column of PLgel mixed-C (Polymer Laboratories Co.) in combination, and polystyrene (PS) is used as a GPC standard material for calculating the molecular weights, and tetrahydrofuran mixed with 2 wt % of an amine compound is used as a GPC measurement solvent.

Modified Conjugated Diene-Based Polymer

The present invention provides a modified conjugated diene-based polymer, though a polymer with a high molecular weight, having low mooney viscosity after being compounded into a rubber composition and achieving excellent processability as well as excellent tensile properties and viscoelasticity properties.

The modified conjugated diene-based polymer according to an embodiment of the present invention is characterized in having a mooney large relaxation area (MLRA) measured at 100° C. and represented by Mathematical Formula 1 below of 1500 MU-s or more.

$$A = \frac{k}{(a+1)}[t_f^{(a+1)} - t_o^{(a+1)}]$$ [Mathematical Formula 1]

In Mathematical Formula 1,
A is a mooney large relaxation area (MLRA),
k is a mooney intercept after 1 second from stopping operation of a rotor of a mooney viscometer,
a is a mooney relaxation ratio,
$t_o$ is an initiation point of mooney relaxation, and
$t_f$ is a finishing point of mooney relaxation.

Here, the initiation point of mooney relaxation may represent a point after 1 second from the stopping of rotor operation, and may mean a point where mooney torque has a k value. In addition, the finishing point of mooney relaxation may represent a point where the measurement of mooney relaxation is finished in the measurement test of mooney relaxation. That is, $t_f$-$t_o$ may represent a mooney relaxation time.

Also, according to an embodiment of the present invention, $t_o$ may be 1 second, and $t_f$ may be 80 seconds to 150 seconds. In other words, the mooney large relaxation area according to an embodiment of the present invention may be an integrated area under a mooney torque-relaxation time curve from 1 second, to 80 seconds to 150 seconds. In addition, the $t_f$ may particularly be 90 seconds to 130 seconds, or 100 seconds to 120 seconds.

Meanwhile, the physical properties of the molecular weight and mooney viscosity of a polymer are properties in proportional relationship and show equal tendency, and a polymer with a high molecular weight has defects of high mooney viscosity and inferior processability. However, the modified conjugated diene-based polymer according to an embodiment of the present invention has a mooney large relaxation area of 1500 MU-s or more and achieves largely improved processability.

In the modified conjugated diene-based polymer of the present invention, the mooney large relaxation area of 1500 MU-s or more is one technical means for serving excellent processability and excellent tensile properties and viscoelasticity properties. If the mooney large relaxation area is 1500 MU-s or more, the target effects of the present invention may be shown. However, if the mooney large relaxation area has a very large value, processability may be deteriorated, and in view of showing excellent processability and excellent tensile properties and viscoelasticity properties in balance, the mooney large relaxation area of the modified conjugated diene-based polymer according to an embodiment of the present invention may be 4000 MU-s or less.

Particularly, the modified conjugated diene-based polymer according to an embodiment of the present invention may have the mooney large relaxation area of 1500 MU-s or more, preferably, 1500 to 4000 MU-s, more preferably, 1800 to 3000 MU-s, 2000 to 3000 MU-s, 2000 to 2800 MU-s or 2400 to 2800 MU-s. The mooney large relaxation area may be a value obtained by plotting a mooney torque graph in accordance with time and then computing from Mathematical Formula 1, and in this case, the mooney viscosity (MV, ML1+4, @100° C.) may be measured by using MV-2000 (ALPHA Technologies Co.) using Large Rotor at a rotor speed of 2±0.02 rpm at 100° C. In this case, a specimen was stood at room temperature (23±3° C.) for 30 minutes or more, and 27±3 g of the polymer was collected and put in a die cavity, and then, measurement was conducted for 4 minutes while operating Platen.

In addition, after measuring mooney viscosity, by measuring the gradient value of mooney viscosity change shown while the torque is released by stopping the rotor, its value may be obtained as a mooney relaxation ratio (a). In addition, the mooney large relaxation area may be obtained from the integration value of the mooney relaxation curve during from 1 second ($t_o$) to 120 seconds ($t_f$) after stopping the rotor, and this integration value may be computed from Mathematical Formula 1. If the mooney relaxation area satisfies the above-described range, the improving effects of processability during compounding a rubber composition may be achieved. Particularly, if the mooney large relaxation area satisfies the above-described range under the mooney viscosity conditions of 70 or more, preferably, 80 or more, even better improving effects of processability may be obtained.

In addition, the modified conjugated diene-based polymer according to an embodiment of the present invention may be a homopolymer of a conjugated diene-based monomer; or a copolymer of a conjugated diene-based monomer and an aromatic vinyl-based monomer, here, the homopolymer of a conjugated diene-based monomer may mean a polymer including a repeating unit derived from a conjugated diene-based monomer, which is formed by polymerizing the conjugated diene-based monomer, and the copolymer may mean a copolymer including a repeating unit derived from a conjugated diene-based monomer and a repeating unit derived from an aromatic vinyl-based monomer, formed by copolymerizing a conjugated diene-based monomer and an aromatic vinyl-based monomer. The conjugated diene-based monomer may be one or more selected from the group consisting of 1,3-butadiene, 2,3-dimethyl-1,3-butadiene, piperylene, 3-butyl-1,3-octadiene, isoprene, 2-phenyl-1,3-butadiene and 2-halo-1,3-butadiene (halo means a halogen atom).

The aromatic vinyl-based monomer may include, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, 1-vinyl-5-hexylnaphthalene, 3-(2-pyrrolidino ethyl)styrene, 4-(2-pyrrolidino ethyl) styrene and 3-(2-pyrrolidino-1-methyl ethyl)-α-methylstyrene.

In another embodiment, the modified conjugated diene-based polymer may be a copolymer which further includes a repeating unit derived from a diene-based monomer of 1 to 10 carbon atoms together with the repeating unit derived from the conjugated diene-based monomer. The repeating unit derived from the diene-based monomer may be a repeating unit derived from a diene-based monomer which is different from the conjugated diene-based monomer, and the diene-based monomer which is different from the conjugated diene-based monomer may be, for example, 1,2-butadiene. If the modified conjugated diene-based polymer is a copolymer further including a diene-based monomer, the modified conjugated diene-based polymer may include the repeating unit derived from the diene-based monomer in an amount of greater than 0 wt % to 1 wt %, greater than 0 wt % to 0.1 wt %, greater than 0 wt % to 0.01 wt %, or greater than 0 wt % to 0.001 wt %, and within this range, effects of preventing gel formation may be achieved.

In addition, if the modified conjugated diene-based polymer is the copolymer, the copolymer may be a random copolymer, and in this case, effects of excellent balance between physical properties may be achieved. The random copolymer may mean the arrangement of repeating units forming a copolymer in disorder.

In addition, the modified conjugated diene-based polymer according to the present invention may include a functional group derived from an aminoalkoxysilane-based modifier and a functional group derived from an epoxy-based modifier in at least one terminal.

Conventionally, the modified conjugated diene-based polymer has been prepared by modifying the terminal of a conjugated diene-based polymer with an aminoalkoxysilane-based modifier to improve affinity with a filler and viscoelasticity properties. However, there are problems in that the modified conjugated diene-based polymer modified by the aminoalkoxysilane-based modifier showed improved viscoelasticity properties but degraded tensile properties and processability.

On the contrary, the modified conjugated diene-based polymer according to an embodiment of the present invention includes a functional group derived from an aminoalkoxysilane-based modifier and a functional group derived from an epoxy-based modifier at the same time, and may achieve excellent tensile properties and processability as well as largely improved viscoelasticity properties.

In another embodiment, the modified conjugated diene-based polymer according to an embodiment of the present invention may include at least one first polymer chain including the functional group derived from the aminoalkoxysilane-based modifier at one terminal; and at least one second polymer chain including the functional group derived from the epoxy-based modifier at one terminal.

Meanwhile, particular examples of the modifier may include a modifier having affinity with silica. The modifier having affinity with silica may mean a modifier containing a functional group having affinity with silica in a compound used as the modifier, and the functional group having affinity with silica may mean a functional group having excellent affinity with a filler, particularly, with a silica-based filler, and possibly making interaction between the silica-based filler and the functional group derived from the modifier.

Particularly, according to an embodiment of the present invention, the aminoalkoxysilane-based modifier may be one or more selected from the compounds represented by Formula 1 to Formula 3 below.

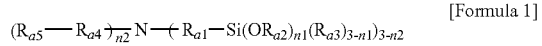
[Formula 1]

In Formula 1,
$R_{a1}$ and $R_{a4}$ are each independently a single bond, or an alkylene group of 1 to 10 carbon atoms,
$R_{a2}$ and $R_{a3}$ are each independently an alkyl group of 1 to 10 carbon atoms,
$R_{a5}$ is a hydrogen atom, an alkyl group of 1 to 10 carbon atoms, a silyl group monosubstituted, disubstituted or trisubstituted with an alkyl group of 1 to 10 carbon atoms, or —$N[R_{a6}Si(OR_{a7})_{n3}(R_{a8})_{3-n3}]_2$, where $R_{a6}$ is a single bond or an alkylene group of 1 to 10 carbon atoms, $R_{a7}$ and $R_{a8}$ are each independently an alkyl group of 1 to 10 carbon atoms, and n3 is an integer of 1 to 3,
$n_1$ is an integer of 1 to 3, and
$n_2$ is an integer of 0 to 2,

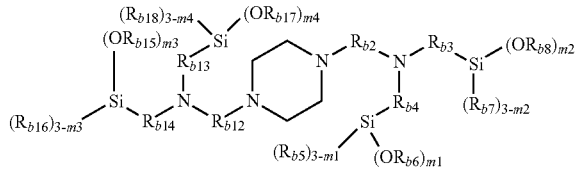
[Formula 2]

In Formula 2, $R_{b2}$ to $R_{b4}$ are each independently an alkylene group of 1 to 10 carbon atoms, $R_{b5}$ to $R_{b8}$ are each independently an alkyl group of 1 to 10 carbon atoms, $R_{b13}$ and $R_{b14}$ are each independently an alkylene group of 1 to 10 carbon atoms, $R_{b15}$ to $R_{b18}$ are each independently an alkyl group of 1 to 10 carbon atoms, and $m_1$, $m_2$, $m_3$ and $m_4$ are each independently an integer of 1 to 3.

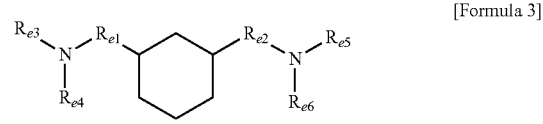
[Formula 3]

In Formula 3, $R_{e1}$ and $R_{e2}$ are each independently an alkylene group of 1 to 10 carbon atoms, $R_{e3}$ to $R_{e6}$ are each independently hydrogen, an alkyl group of 1 to 10 carbon atoms or —$R_{e7}SiR_{e8}R_{e9}R_{e10}$, where at least one of $R_{e3}$ to $R_{e6}$ is —$R_{e7}SiR_{e8}R_{e9}R_{e10}$, $R_{e7}$ is a single bond or an alkylene group of 1 to 10 carbon atoms, and $R_{e8}$ to $R_{e10}$ are each independently an alkyl group of 1 to 10 carbon atoms or an alkoxy group of 1 to 10 carbon atoms, where at least one of $R_{e8}$ to $R_{e10}$ is an alkoxy group of 1 to 10 carbon atoms.

Particularly, in Formula 1, $R_{a1}$ and $R_{a4}$ are each independently a single bond, or an alkylene group of 1 to 5 carbon atoms, $R_{a2}$ and $R_{a3}$ are each independently an alkyl group of 1 to 5 carbon atoms, $R_{a5}$ is a hydrogen atom, an alkyl group of 1 to 5 carbon atoms, a silyl group trisubstituted with an alkyl group of 1 to 5 carbon atoms, or —$N[R_{a6}Si(OR_{a7})_{n3}(R_{a8})_{3-n3}]_2$, where $R_{a6}$ is a single bond or an alkylene group of 1 to 5 carbon atoms, $R_{a7}$ and $R_{a8}$ are each independently an alkyl group of 1 to 5 carbon atoms, n3 is an integer of 2 to 3, $n_1$ is an integer of 2 to 3, and $n_2$ may be an integer of 0 to 2.

More particularly, the compound represented by Formula 1 may be one or more selected from the group consisting of N,N-bis(3-(dimethoxy(methyl)silyl)propyl)-methyl-1-amine, N,N-bis(3-(diethoxy(methyl)silyl)propyl)-methyl-1- amine, N,N-bis(3-(trimethoxysilyl)propyl)-methyl-1-amine, N,N-bis(3-(triethoxysilyl)propyl)-methyl-1-amine, N,N-diethyl-3-(trimethoxysilyl)propan-1-amine, N,N-diethyl-3-(triethoxysilyl)propan-1-amine, tri(trimethoxysilyl)amine, tri(3-(trimethoxysilyl)propyl)amine, N,N-bis(3-(diethoxy(methyl)silyl)propyl)-1,1,1-trimethlysilanamine, and $N^1,N^1,N^3,N^3$-tetrakis(3-(trimethoxysilyl)propyl)propane-1,3-diamine.

In another embodiment, in Formula 2, $R_{b2}$ to $R_{b4}$ are each independently an alkylene group of 1 to 6 carbon atoms, $R_{b5}$ to $R_{b8}$ are each independently an alkyl group of 1 to 6 carbon atoms, $R_{b13}$ and $R_{b14}$ are each independently an alkylene group of 1 to 6 carbon atoms, $R_{b15}$ to $R_{b18}$ are each independently an alkyl group of 1 to 6 carbon atoms, and $m_1$, $m_2$, $m_3$ and $m_4$ are each independently an integer of 1 to 3.

More particularly, the compound represented by Formula 2 may be 3,3'-(piperazine-1,4-diyl)bis(N,N-bis(3-(triethoxysilyl)propyl)propan-1-amine).

In another embodiment, in Formula 3, $R_{e1}$ and $R_{e2}$ are each independently an alkylene group of 1 to 6 carbon atoms, $R_{e3}$ to $R_{e6}$ are each independently an alkyl group or 1 to 6 carbon atoms or $-R_{e7}SiR_{e8}R_{e9}R_{e10}$, where at least one of $R_{e3}$ to $R_{e6}$ is $-R_{e7}SiR_{e8}R_{e9}R_{e10}$, $R_{e7}$ is a single bond or an alkylene group of 1 to 6 carbon atoms, and $R_{e8}$ to $R_{e10}$ are each independently an alkyl group of 1 to 6 carbon atoms or an alkoxy group of 1 to 6 carbon atoms, where at least one of $R_{e8}$ to $R_{e10}$ is an alkoxy group of 1 to 6 carbon atoms.

More particularly, the compound represented by Formula 3 may be N,N'-(cyclohexane-1,3-diylbis(methylene))bis(3-(triethoxysilyl)-N-(3-(triethoxysilyl)propyl)propan-1-amine).

According to an embodiment of the present invention, the epoxy-based modifier may be selected from the compounds represented by the following Formula 4 to Formula 7:

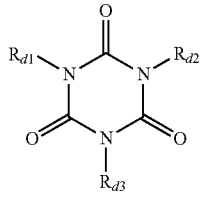

[Formula 4]

in Formula 4,
$R_{d1}$ to $R_{d3}$ are each independently hydrogen, an alkyl group of 1 to 10 carbon atoms or $-R_{d4}R_{d5}$, where at least one of $R_{d1}$ to $R_{d3}$ is $-R_{d4}R_{d5}$, $R_{d4}$ is an alkylene group of 1 to 10 carbon atoms, which includes or excludes a heteroatom, and $R_{d5}$ is an epoxy group,

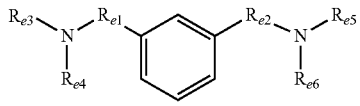

[Formula 5]

in Formula 5,
$R_{e1}$ and $R_{e2}$ are each independently an alkylene group of 1 to 10 carbon atoms, and
$R_{e3}$ to $R_{e6}$ are each independently hydrogen, an alkyl group of 1 to 10 carbon atoms or $-R_{e7}R_{e8}$, where at least one of $R_{e3}$ to $R_{e6}$ is $-R_{e7}R_{e8}$, $R_{e7}$ is an alkylene group of 1 to 10 carbon atoms, which includes or excludes one or more heteroatoms selected from N, S and O, and $R_{e8}$ is an epoxy group,

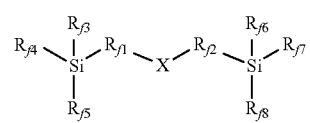

[Formula 6]

in Formula 6,
X is O or S,
$R_{f1}$ and $R_{f2}$ are each independently a single bond, or an alkylene group of 1 to 10 carbon atoms, and
$R_{f3}$ to $R_{f8}$ are each independently hydrogen, an alkyl group of 1 to 15 carbon atoms, an alkoxy group of 1 to 10 carbon atoms, an aryl group of 6 to 10 carbon atoms, a cycloalkyl group of 5 to 10 carbon atoms, an aralkyl group of 7 to 14 carbon atoms or $-R_{f9}R_{f10}$, where at least one of $R_{f3}$ to $R_{f8}$ is $-R_{f9}R_{f10}$, $R_{f9}$ is an alkylene group of 1 to 12 carbon atoms, which includes or excludes a heteroatom, and $R_{f10}$ is an epoxy group,

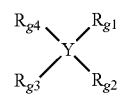

[Formula 7]

in Formula 7,
$R_{g1}$ to $R_{g4}$ are each independently hydrogen, an alkyl group of 1 to 10 carbon atoms, an alkoxy group of 1 to 10 carbon atoms, an aryl group of 6 to 12 carbon atoms or $-R_{g5}OR_{g6}$, where at least one of $R_{g1}$ to $R_{g4}$ is $-R_{g5}OR_{g6}$, $R_{g5}$ is a single bond or an alkylene group of 1 to 10 carbon atoms, and $R_{g6}$ is an epoxyalkyl group of 3 to 10 carbon atoms, and Y is C or N, where if Y is N, $R_{g4}$ is not present.

Particularly, in Formula 4, $R_{d1}$ to $R_{d3}$ are each independently an alkyl group of 1 to 6 carbon atoms or $-R_{d4}R_{d5}$, where at least one of $R_{d1}$ to $R_{d3}$ is $-R_{d4}R_{d5}$, $R_{d4}$ is an alkylene group of 1 to 6 carbon atoms, which includes or excludes a heteroatom, $R_{d5}$ is an epoxy group, and the heteroatom may be O (oxygen atom).

More particularly, the compound represented by Formula 4 may be a compound represented by Formula 4-1 below.

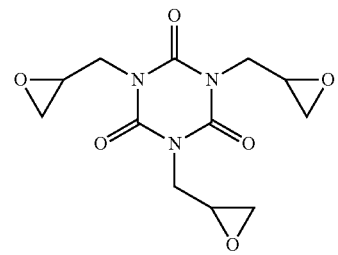

[Formula 4-1]

In addition, in Formula 5, $R_{e1}$ and $R_{e2}$ are each independently an alkylene group of 1 to 6 carbon atoms, and $R_{e3}$ to $R_{e6}$ are each independently an alkyl group of 1 to 6 carbon atoms or $-R_{e7}R_{e8}$, where at least one of $R_{e3}$ to $R_{e6}$ is $-R_{e7}R_{e8}$, $R_{e7}$ is an alkylene group of 1 to 6 carbon atoms, which includes or excludes a heteroatom, $R_{e8}$ is an epoxy group, and the heteroatom may be O.

More particularly, the compound represented by Formula 5 may be a compound represented by Formula 5-1 below.

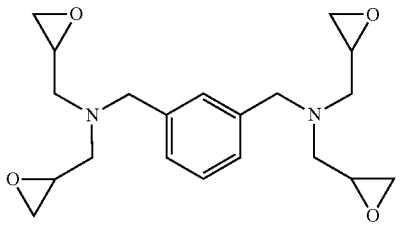

[Formula 5-1]

In addition, in Formula 6, X is O or S, $R_{f1}$ and $R_{f2}$ are each independently a single bond, or an alkylene group of 1 to 6 carbon atoms, and $R_{f3}$ to $R_{f8}$ are each independently an alkyl group of 1 to 6 carbon atoms, an alkoxy group of 1 to 6 carbon atoms, or —$R_{f9}R_{f10}$, where at least one of $R_{f3}$ to $R_{f8}$ is —$R_{f9}R_{f10}$, $R_{f9}$ is an alkylene group of 1 to 6 carbon atoms, which includes or excludes a heteroatom, $R_{f10}$ is an epoxy group, and the heteroatom may be O.

More particularly, the compound represented by Formula 6 may be a compound represented by Formula 6-1 or Formula 6-2 below.

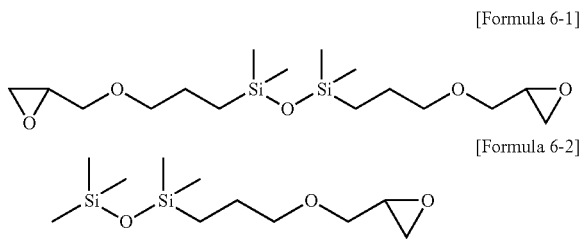

[Formula 6-1]

[Formula 6-2]

In addition, in Formula 7, $R_{g1}$ to $R_{g4}$ are each independently an alkyl group of 1 to 6 carbon atoms, an alkoxy group of 1 to 6 carbon atoms, or —$R_{g5}OR_{g6}$, where at least one of $R_{g1}$ to $R_{g4}$ is —$R_{g5}OR_{g6}$, $R_{g5}$ is a single bond or an alkylene group of 1 to 6 carbon atoms, $R_{g6}$ is an epoxyalkyl group of 3 to 6 carbon atoms, and Y is C or N, where if Y is N, $R_{g4}$ is not present.

More particularly, the compound represented by Formula 7 may be selected from the compounds represented by Formula 7-1 to Formula 7-4 below.

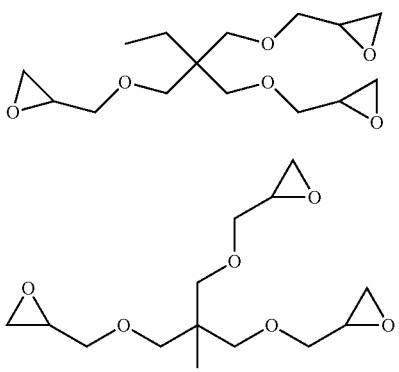

[Formula 7-1]

[Formula 7-2]

-continued

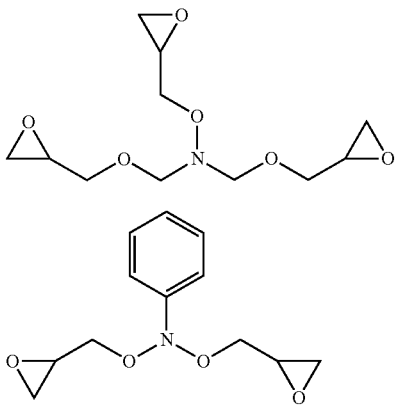

[Formula 7-3]

[Formula 7-4]

In another embodiment, the modified conjugated diene-based polymer according to an embodiment of the present invention may include a functional group derived from a modification initiator in the other terminal excluding the terminal where the functional group derived from the modifier is included, and in this case, the modification initiator may be a reaction product of an N-functional group-containing compound and an organometallic compound.

Particularly, the N-functional group-containing compound may be an N-functional group-containing aromatic hydrocarbon compound including an amino group, an amide group, an imidazole group, a pyrimidyl group or a cyclic amino group, each of which is unsubstituted or substituted with a substituent, and the substituent may be an alkyl group of 1 to 20 carbon atoms, a cycloalkyl group of 3 to 20 carbon atoms, an aryl group of 6 to 20 carbon atoms, an alkylaryl group of 7 to 20 carbon atoms, an arylalkyl group of 7 to 20 carbon atoms or an alkoxysilyl group of 1 to 10 carbon atoms.

More particularly, the N-functional group-containing compound may be a compound represented by Formula 8 below.

[Formula 8]

In Formula 8, $R_1$ to $R_3$ are each independently hydrogen; an alkyl group of 1 to 30 carbon atoms; an alkenyl group of 2 to 30 carbon atoms; an alkynyl group of 2 to 30 carbon atoms; a heteroalkyl group of 1 to 30 carbon atoms, a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms, $R_4$ is a single bond; an alkylene group of 1 to 20 carbon atoms; a cycloalkylene group of 5 to 20 carbon atoms; or an arylene group of 6 to 20 carbon atoms, each of which is unsubstituted or substituted with a substituent, wherein the substituent is an alkyl group of 1 to 10 carbon atoms, a cycloalkyl group of 5 to 10 carbon atoms, or an aryl group of 6 to 20 carbon atoms, $R_5$ is an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; a heterocyclic group of 3 to 30 carbon atoms; or a functional group represented by Formula 8a or Formula 8b below, and n is an integer of 1 to 5, at least one of $R_5$ groups is a functional group represented by Formula 8a or Formula 8b below, and if n is an integer of 2 to 5, multiple $R_5$ groups may be the same or different,

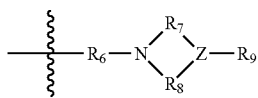

[Formula 8a]

in Formula 8a, $R_6$ is an alkylene group of 1 to 20 carbon atoms; a cycloalkylene group of 5 to 20 carbon atoms; or an arylene group of 6 to 20 carbon atoms, each of which is unsubstituted or substituted with a substituent, wherein the substituent is an alkyl group of 1 to 10 carbon atoms, a cycloalkyl group of 5 to 10 carbon atoms, or an aryl group of 6 to 20 carbon atoms, $R_7$ and $R_8$ are each independently an alkylene group of 1 to 20 carbon atoms, which is unsubstituted or substituted with alkyl group of 1 to 10 carbon atoms, a cycloalkyl group of 5 to 10 carbon atoms, or an aryl group of 6 to 20 carbon atoms, $R_9$ is hydrogen; an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms, and Z is an N, O or S atom, where if Z is O or S, $R_9$ is not present,

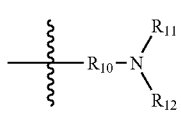

[Formula 8b]

in Formula 8b, $R_{10}$ is an alkylene group of 1 to 20 carbon atoms; a cycloalkylene group of 5 to 20 carbon atoms; or an arylene group of 6 to 20 carbon atoms, each of which is unsubstituted or substituted with a substituent, wherein the substituent is an alkyl group of 1 to 10 carbon atoms, a cycloalkyl group of 5 to 10 carbon atoms, or an aryl group of 6 to 20 carbon atoms, and $R_{11}$ and $R_{12}$ are each independently an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms, where $R_{11}$ and $R_{12}$ are connected with each other, and together with N to which they are attached to form a heterocyclic group of 2 to 20 carbon atoms.

More particularly, the compound represented by Formula 8 may be, in Formula 8, $R_1$ to $R_3$ are each independently hydrogen; an alkyl group of 1 to 10 carbon atoms; an alkenyl group of 2 to 10 carbon atoms; or an alkynyl group of 2 to 10 carbon atoms, $R_4$ is a single bond; or an unsubstituted alkylene group of 1 to 10 carbon atoms, $R_5$ is an alkyl group of 1 to 10 carbon atoms; an alkenyl group of 2 to 10 carbon atoms; an alkynyl group of 2 to 10 carbo atoms; or a functional group represented by Formula 8a or Formula 8b, in Formula 8a, $R_6$ is an unsubstituted alkylene group of 1 to 10 carbon atoms, $R_7$ and $R_8$ are each independently an unsubstituted alkylene group of 1 to 10 carbon atoms, $R_9$ is an alkyl group of 1 to 10 carbon atoms; a cycloalkyl group of 5 to 20 carbon atoms; an aryl group of 5 to 20 carbon atoms; or a heterocyclic group of 3 to 20 carbon atoms, an in Formula 8b, $R_{10}$ is an unsubstituted alkylene group of 1 to 10 carbon atoms, $R_{11}$ and $R_{12}$ are each independently an alkyl group of 1 to 10 carbon atoms; a cycloalkyl group of 5 to 20 carbon atoms; an aryl group of 6 to 20 carbon atoms; or a heterocyclic group of 3 to 20 carbon atoms, where $R_{11}$ and $R_{12}$ are connected with each other, and together with N to which they are attached to form a heterocyclic group of 2 to 20 carbon atoms.

Further particularly, the compound represented by Formula 8 may be the compounds represented by Formula 8-1 to Formula 8-3 below.

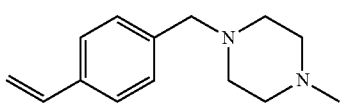

[Formula 8-1]

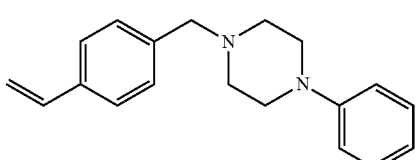

[Formula 8-2]

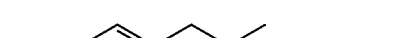

[Formula 8-3]

In addition, the organometallic compound may be an organic alkali metal compound, for example, one or more selected from an organolithium compound, organosodium compound, organopotassium compound, organorubidium compound and organocesium compound.

Particularly, the organometallic compound may be one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

In addition, the modified conjugated diene-based polymer according to an embodiment of the present invention may have a number average molecular weight (Mn) of 100,000 g/mol to 2,000,000 g/mol, 200,000 g/mol to 1,000,000 g/mol, or 400,000 g/mol to 800,000 g/mol, and a weight average molecular weight (Mw) of 100,000 g/mol to 3,000,000 g/mol, 400,000 g/mol to 2,000,000 g/mol, or 800,000 g/mol to 1,500,000 g/mol. Within these ranges, effects of excellent rotation resistance and wet skid resistance may be achieved. In another embodiment, the modified conjugated diene-based polymer may have molecular weight distribution (PDI; MWD; Mw/Mn) of 1.5 or more or 1.5 to 3.0, and within this range, effects of excellent tensile properties, viscoelasticity properties, and excellent balance between physical properties may be achieved. At the same time, the modified conjugated diene-based polymer has a unimodal shape molecular weight distribution curve by gel permeation chromatography (GPC), which corresponds to molecular weight distribution shown by a polymer prepared by continuous-type polymerization and may mean that the modified conjugated diene-based polymer has uniform properties. That is, the modified conjugated diene-based polymer according to an embodiment of the present invention is prepared by continuous-type polymerization, and thus, has a unimodal shape molecular weight distribution curve and molecular weight distribution of 1.5 or more.

In another embodiment, the modified conjugated diene-based polymer may have a mooney relaxation ratio (–S/R value) measured at 100° C. of 0.5 or less, 0.4 or less or 0.3 or less, and the lower limit of the mooney relaxation ratio is not specifically limited, and may be, for example, 0.1 or more or 0.2 or more.

Here, the mooney relaxation ratio represents stress change shown as the reaction to the same amount of strain and may be measured using a mooney viscometer. Particularly, the mooney relaxation ratio was measured by using Large Rotor of MV2000E of Monsanto Co. in conditions of 100° C. and a rotor speed of 2±0.02 rpm. A polymer was stood at room temperature (23±5° C.) for 30 minutes or more, and 27±3 g of the polymer was collected and put in a die cavity, and then, Platen was operated, mooney viscosity was measured while applying torque, and the gradient value of mooney torque change shown while releasing the torque was measured.

Meanwhile, the mooney relaxation ratio may be used as the index of the branched structure of a corresponding polymer. For example, when comparing polymers having the same mooney viscosity, with the increase of branches, the mooney relaxation ratio may decrease, and the mooney relaxation ratio may be used as the index of the degree of branching.

In addition, the modified conjugated diene-based polymer may have a mooney viscosity at 100° C. of 70 or more, 80 to 150, or 80 to 120, and within this range, excellent effects of processability and productivity may be achieved.

In addition, the modified conjugated diene-based polymer may have the vinyl content of 5 wt % or more, 10 wt % or more, or 10 wt % to 60 wt %. Here, the vinyl content may mean the amount of not 1,4-added but 1,2-added conjugated diene-based monomer based on 100 wt % of a conjugated diene-based copolymer formed using a monomer having a vinyl group and an aromatic vinyl-based monomer.

As described above, the modified conjugated diene-based polymer according to an embodiment of the present invention may have a high mooney large relaxation area of 1500 MU-s or more, and may include first and second polymer chains, respectively including functional groups derived from first and second modifiers, at one terminal. Meanwhile, the modified conjugated diene-based polymer may preferably be prepared by a preparation method described below to satisfy the above-described characteristics, but if all the above-described characteristics are satisfied, effects to be achieved in the present invention may be accomplished.

Method for Preparing Modified Conjugated Diene-Based Polymer

In addition, the present invention provides a method for preparing the modified conjugated diene-based polymer.

The method for preparing the modified conjugated diene-based polymer according to an embodiment of the present invention includes polymerizing a conjugated diene-based monomer, or an aromatic vinyl-based monomer and a conjugated diene-based monomer in the presence of a polymerization initiator in a hydrocarbon solvent to prepare an active polymer (S1); and reacting or coupling the active polymer prepared in step (S1) with a first modifier and a second modifier (S2), wherein the first modifier is an aminoalkoxysilane-based modifier, and the second modifier is an epoxy-based modifier.

The aminoalkoxysilane-based modifier and the epoxy-based modifier are the same as described above.

The hydrocarbon solvent is not specifically limited, but may be, for example, one or more selected from the group consisting of n-pentane, n-hexane, n-heptane, isooctane, cyclohexane, toluene, benzene and xylene.

The polymerization initiator may be used in 0.1 equivalents to 3.0 equivalents, preferably, 0.1 equivalents to 2.0 equivalents, more preferably, 0.5 equivalents to 1.5 equivalents based on 1.0 equivalent of the monomer.

In another embodiment, the polymerization initiator may be used in 0.01 mmol to 10 mmol, 0.05 mmol to 5 mmol, 0.1 mmol to 2 mmol, 0.1 mmol to 1 mmol, or 0.15 to 0.8 mmol based on total 100 g of the monomer. Here, the total 100 g of the monomer may show the conjugated diene-based monomer, or the sum of the conjugated diene-based monomer and the aromatic vinyl-based monomer.

Meanwhile, the polymerization initiator may be an organometallic compound, for example, one or more selected from an organolithium compound, organosodium compound, organopotassium compound, organorubidium compound and organocesium compound.

Particularly, the organometallic compound may be one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

In another embodiment, the polymerization initiator may be a modification initiator, and the modification initiator may be the reaction product of an N-functional group-containing compound and the organometallic compound.

The polymerization of step (S1) may be, for example, anionic polymerization, and particularly, living anionic polymerization by which an anionic active part is formed at the polymerization terminal through propagation reaction by anions. In addition, the polymerization of step (S1) may be a polymerization with heating, an isothermal polymerization, or a polymerization at a constant temperature (adiabatic polymerization). Here, the polymerization at a constant temperature means a polymerization method including a step of polymerizing using self-generated heat of reaction without optionally applying heat after adding a polymerization initiator, and the polymerization with heating means a polymerization method including injecting the polymerization initiator and then, increasing the temperature by optionally applying heat. The isothermal polymerization means a polymerization method by which the temperature of a polymer is kept constant by increasing heat by applying heat or taking heat after adding the polymerization initiator.

In addition, according to an embodiment of the present invention, the polymerization of step (S1) may be performed by further including a diene-based compound of 1 to 10 carbon atoms in addition to the conjugated diene-based monomer, and in this case, effects of preventing the formation of gel on the wall of a reactor during operation for a long time may be achieved. The diene-based compound may include, for example, 1,2-butadiene.

The polymerization of step (S1) may be conducted in a temperature range of 80° C. or less, −20° C. to 80° C., 0° C. to 80° C., 0° C. to 70° C., or 10° C. to 70° C. Within the range, the molecular weight distribution of a polymer is controlled narrow, and the improving effect of physical properties is excellent.

The active polymer prepared by step (S1) may mean a polymer in which a polymer anion and an organometallic cation are coupled.

Step (S1) may be performed by suitably selecting a continuous type polymerization method or a batch type polymerization method, and may preferably be performed by a continuous type polymerization method in view of the improvement of productivity and processability.

The term "polymerization reactant" in the present invention may mean an intermediate of a polymer type, which is under polymerization in each reactor during performing step (S1) or may mean a polymer with a polymerization conversion ratio of less than 95% under polymerization in a reactor, after finishing step (S1) or step (S2) and prior to obtaining the active polymer or the modified conjugated diene-based polymer.

According to an embodiment of the present invention, the molecular weight distribution (PDI, polydispersed index; MWD, Mw/Mn) of the active polymer prepared in step (S1) may be 1.5 or more or 1.3 to 3.0, and within this range, excellent improving effects of processability may be achieved.

Meanwhile, the polymerization of step (S1) may be performed by including a polar additive, and the polar additive may be added in a ratio of 0.001 g to 50 g, 0.001 g to 10 g, or 0.005 g to 0.1 g based on total 100 g of the monomer. In another embodiment, the polar additive may be added in a ratio of 0.001 g to 10 g, 0.005 g to 5 g, or 0.005 g to 4 g based on total 1 mmol of the polymerization initiator.

The polar additive may be, for example, one or more selected from the group consisting of tetrahydrofuran, 2,2-di(2-tetrahydrofuryl)propane, diethyl ether, cyclopentyl ether, dipropyl ether, ethylene methyl ether, ethylene dimethyl ether, diethyl glycol, dimethyl ether, tert-butoxy ethoxy ethane, bis(3-dimethylaminoethyl) ether, (dimethylaminoethyl) ethyl ether, trimethylamine, triethylamine, tripropylamine, N,N,N',N'-tetramethylethylenediamine, sodium mentholate, and 2-ethyl tetrahydrofufuryl ether, and may preferably be 2,2-di(2-tetrahydrofuryl)propane, triethylamine, tetramethylethylenediamine, sodium mentholate, or 2-ethyl tetrahydrofufuryl ether. If the polar additive is included, and if a conjugated diene-based monomer and an aromatic vinyl-based monomer are copolymerized, the difference of their reaction rates may be compensated, and effects of inducing easy formation of a random copolymer may be achieved.

According to an embodiment of the present invention, the reaction or coupling of step (S2) may be performed in a modification reactor, particularly, may be performed by reacting or coupling the active polymer with the first modifier and the second modifier. Here, the first modifier and the second modifier may be injected in order or in batch, and then reacted or coupled with the active polymer, and the first modifier and the second modifier may be used in a molar ratio of 10:1 to 5:1 or 2:1 to 1:1.

In this case, the modifier may be used in an amount of 0.01 mmol to 10 mmol based on total 100 g of the monomer. In another embodiment, the modifier may be used in a molar ratio of 1:0.1 to 10, 1:0.1 to 5, or 1:0.1 to 1:3, based on 1 mol of the polymerization initiator of step (S1).

In addition, according to an embodiment of the present invention, the modifier may be injected into a modification reactor, and step (S2) may be conducted in the modification reactor. In another embodiment, the modifier may be injected into a transporting part for transporting the active polymer prepared in step (S1) to a modification reactor for conducting step (S2), and the reaction or coupling may be performed by the mixing of the active polymer with the modifier in the transporting part.

The method for preparing a modified conjugated diene-based polymer according to an embodiment of the present invention is a method satisfying the properties of the above-described modified conjugated diene-based polymer. Effects intended to achieve in the present invention may be achieved if the above properties are satisfied as described above, but the physical properties of the modified conjugated diene-based polymer according to the present invention may be achieved by diversely controlling other polymerization conditions.

Rubber Composition

Also, the present invention provides a rubber composition including the modified conjugated diene-based polymer.

The rubber composition may include the modified conjugated diene-based polymer in an amount of 10 wt % or more, 10 wt % to 100 wt %, or 20 wt % to 90 wt %, and within this range, mechanical properties such as tensile strength and abrasion resistance are excellent, and effects of excellent balance between physical properties may be achieved.

In addition, the rubber composition may further include other rubber components, as necessary, in addition to the modified conjugated diene-based polymer, and in this case, the rubber component may be included in an amount of 90 wt % or less based on the total weight of the rubber composition. In a particular embodiment, the other rubber component may be included in an amount of 1 part by weight to 900 parts by weight based on 100 parts by weight of the modified conjugated diene-based copolymer.

The rubber component may be, for example, natural rubber or synthetic rubber, and may particularly be natural rubber (NR) including cis-1,4-polyisoprene; modified natural rubber which is obtained by modifying or purifying common natural rubber, such as epoxidized natural rubber (ENR), deproteinized natural rubber (DPNR), and hydrogenated natural rubber; and synthetic rubber such as a styrene-butadiene copolymer (SBR), a polybutadiene (BR), a polyisoprene (IR), butyl rubber (IIR), an ethylene-propylene copolymer, a polyisobutylene-co-isoprene, neoprene, a poly (ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), polysulfide rubber, acryl rubber, urethane rubber, silicone rubber, epichlorohydrin rubber, and halogenated butyl rubber, and any one or mixtures two or more thereof may be used.

The rubber composition may include a filler of 0.1 parts by weight to 200 parts by weight, or 10 parts by weight to 120 parts by weight based on 100 parts by weight of the modified conjugated diene-based polymer of the present invention. The filler may be, for example, a silica-based filler, particularly, wet silica (hydrated silicate), dry silica (anhydrous silicate), calcium silicate, aluminum silicate, or colloid silica. Preferably, the filler may be wet silica which has the most significant improving effect of destruction characteristics and compatible effect of wet grip. In addition, the rubber composition may further include a carbon-based filler, as necessary.

In another embodiment, if silica is used as the filler, a silane coupling agent may be used together for the improvement of reinforcing and low exothermic properties. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or mixtures of two or more thereof may be used. Preferably, bis(3-triethoxysilylpropyl)polysulfide or 3-trimethoxysilylpropylbenzothiazyltetrasulfide may be used in consideration of the improving effect of reinforcing properties.

In addition, in the rubber composition according to an embodiment of the present invention, since a modified conjugated diene-based polymer in which a functional group having high affinity with silica is brought in an active part is used as a rubber component, the compounding amount of the silane coupling agent may be smaller than a common case. Thus, the silane coupling agent may be used in an amount of 1 part by weight to 20 parts by weight, or 5 parts by weight to 15 parts by weight based on 100 parts by weight of silica. Within the above amount range, effects as a coupling agent may be sufficiently exhibited, and preventing effects of gelation of a rubber component may be achieved.

The rubber composition according to an embodiment of the present invention may be sulfur crosslinkable, and so may further include a vulcanizing agent. The vulcanizing agent may particularly be a sulfur powder and may be included in an amount of 0.1 parts by weight to 10 parts by weight based on 100 parts by weight of the rubber component. Within the above amount range, elasticity and strength required for a vulcanized rubber composition may be secured, and at the same time, an excellent low fuel consumption ratio may be achieved.

The rubber composition according to an embodiment of the present invention may further include various additives used in a common rubber industry in addition to the above components, particularly, a vulcanization accelerator, a process oil, an antioxidant, a plasticizer, an antiaging agent, a scorch preventing agent, a zinc white, stearic acid, a thermosetting resin, or a thermoplastic resin.

The vulcanization accelerator may include, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), in an amount of 0.1 parts by weight to 5 parts by weight based on 100 parts by weight of the rubber component.

The process oil acts as a softener in a rubber composition and may include, for example, a paraffin-based, naphthene-based, or aromatic compound. An aromatic process oil may be used in consideration of tensile strength and abrasion resistance, and a naphthene-based or paraffin-based process oil may be used in consideration of hysteresis loss and properties at a low temperature. The process oil may be included in an amount of 100 parts by weight or less based on 100 parts by weight of the rubber component. Within the above-described range, the deterioration of the tensile strength and low exothermic properties (low fuel consumption ratio) of the vulcanized rubber may be prevented.

The antioxidant may include, for example, 2,6-di-t-butyl paracresol, dibutylhydroxytoluenyl, 2,6-bis((dodecylthio)methyl)-4-nonylphenol or 2-methyl-4,6-bis((octylthio)methyl)phenol, and may be used in an amount of 0.1 parts by weight to 6 parts by weight based on 100 parts by weight of a rubber component.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a mixing prescription. A rubber composition having low exothermic properties and good abrasion properties may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, the present invention provides a tire manufactured using the rubber composition.

The tire may be a tire or include a tire tread.

EXAMPLES

Hereinafter, the present invention will be explained in more detail referring to embodiments. Embodiments according to the present invention may be modified into various other types, and the scope of the present invention should not be limited to the embodiments described below. The embodiments of the present invention are provided for completely explaining the present invention to a person having an average knowledge in the art.

Example 1

To a first reactor among continuous reactors of two reactors connected in series, injected were a styrene solution in which 60 wt % of styrene was dissolved in n-hexane in a rate of 258.3 g/h, a 1,3-butadiene solution in which 60 wt % of 1,3-butadiene was dissolved in n-hexane in a rate of 1.41 kg/h, n-hexane in a rate of 4.68 kg/h, a solution in which 2 wt % of 2,2-(di-2(tetrahydrofuyl)propane was dissolved in n-hexane as a polar additive in a rate of 11.5 g/h, and an n-butyllithium solution in which 2 wt % of n-butyllithium was dissolved in n-hexane in a rate of 29.5 g/h. In this case, the temperature of the first reactor was maintained to 65° C., and at a point where a polymerization conversion ratio reached 95%, a polymerization reactant was transported from the first reactor to a second reactor via a transport pipe.

The polymerization reactant was transported from the first reactor to the second reactor, and a solution in which 2 wt % of N,N'-(cyclohexane-1,3-diylbis(methylene))bis(3-(trimethoxysilyl)-N-(3-(trimethoxysilyl)propyl)propan-1-amine) was dissolved, was injected in a rate of 92.5 g/h, and a solution in which 1 wt % of tris((oxiran-2-ylmethoxy)methyl)amine was dissolved, was injected in a rate of 64.5 g/h, as modifiers, to the second reactor. The temperature of the second reactor was maintained to 70° C.

After that, to a polymerization solution discharged from the second reactor, an IR1520 (BASF Co.) solution in which 30 wt % was dissolved as an antioxidant, was injected in a rate of 97.6 g/h and stirred. The polymerization reactant thus obtained was injected into hot water heated with steam and stirred to remove solvents to prepare a modified conjugated diene-based polymer.

Example 2

A modified conjugated diene-based polymer was prepared by performing the same method as in Example 1 except for injecting a solution in which 2 wt % of N,N'-(cyclohexan-1,3-diylbis(methylene))bis(3-(trimethoxysilyl)-N-(3-(trimethoxysilyl)propyl)propan-1-amine) was dissolved in a rate of 61.7 g/h and a solution in which 1 wt % of tris((oxiran-2-ylmethoxy)methyl)amine was dissolved in a rate of 43.0 g/h, as modifiers, in Example 1.

Example 3

A modified conjugated diene-based polymer was prepared by performing the same method as in Example 1 except for injecting a solution in which 2 wt % of N,N'-(cyclohexan-1,3-diylbis(methylene))bis(3-(trimethoxysilyl)-N-(3-(trimethoxysilyl)propyl)propan-1-amine) was dissolved in a rate of 30.8 g/h and a solution in which 1 wt % of tris((oxiran-2-ylmethoxy)methyl)amine was dissolved in a rate of 21.5 g/h, as modifiers, in Example 1.

Comparative Example 1

A modified conjugated diene-based polymer was prepared by performing the same method as in Example 1 except for injecting an n-butyllithium solution in which 2 wt % of n-butyllithium was dissolved in n-hexane in a rate of 29.5 g/h, and a solution in which 2 wt % of N,N'-(cyclohexane-1,3-diylbis(methylene))bis(3-(trimethoxysilyl)-N-(3-(trimethoxysilyl)propyl)propan-1-amine) was dissolved in a rate of 92.5 g/h, as a modifier, in Example 1.

Comparative Example 2

A modified conjugated diene-based polymer was prepared by performing the same method as in Example 1 except for injecting an n-butyllithium solution in which 2 wt % of n-butyllithium was dissolved in n-hexane in a rate of 29.5 g/h, and a solution in which 1 wt % of tris((oxiran-2-ylmethoxy)methyl)amine was dissolved in a rate of 64.5 g/h, as a modifier, in Example 1.

Comparative Example 3

A modified conjugated diene-based polymer was prepared by performing the same method as in Example 1 except for injecting an n-butyllithium solution in which 2 wt % of n-butyllithium was dissolved in n-hexane in a rate of 21.0 g/h, and a solution in which 1 wt % of 3,3'-(1,1,3,3-tetramethoxydisiloxane-1,3-diyl)bis(N,N-diethylpropan-1-amine) was dissolved in a rate of 98.0 g/h, as a modifier, in Example 1.

Comparative Example 4

A modified conjugated diene-based polymer was prepared by performing the same method as in Example 1 except for injecting a solution in which 2 wt % of N,N'-(cyclohexan-1,3-diylbis(methylene))bis(3-(trimethoxysilyl)-N-(3-(trimethoxysilyl)propyl)propan-1-amine) was dissolved in a rate of 92.5 g/h and a solution in which 1 wt % of 3,3'-(1,1,3,3-tetramethoxydisiloxane-1,3-diyl)bis(N,N-diethylpropan-1-amine) was dissolved in a rate of 98.0 g/h, as modifiers, in Example 1.

Comparative Example 5

A modified conjugated diene-based polymer was prepared by performing the same method as in Example 1 except for injecting a solution in which 1 wt % of tris((oxiran-2-ylmethoxy)methyl)amine was dissolved in a rate of 64.5 g/h and a solution in which 1 wt % of 3,3'-(1,1,3,3-tetramethoxydisiloxane-1,3-diyl)bis(N,N-diethylpropan-1-amine) was dissolved in a rate of 98.0 g/h, as modifiers, in Example 1.

Experimental Example 1

With respect to each of the modified conjugated diene-based polymers prepared in the Examples and the Comparative Examples, styrene unit and vinyl contents in each polymer, a weight average molecular weight (Mw, $\times 10^3$ g/mol), a number average molecular weight (Mn, $\times 10^3$ g/mol), molecular weight distribution (PDI, MWD), a coupling number, mooney viscosity (MV), a mooney relaxation ratio (−S/R), and a mooney large relaxation area were measured, respectively. The results are shown in Table 1 below.

1) Styrene Unit and Vinyl Contents (Wt %)

The styrene unit (SM) and vinyl contents in each polymer were measured and analyzed using Varian VNMRS 500 MHz NMR.

During measuring NMR, 1,1,2,2-tetrachloroethane was used as a solvent, and styrene unit and vinyl contents were calculated by calculating a solvent peak as 5.97 ppm, and regarding 7.2-6.9 ppm as random styrene peaks, 6.9-6.2 ppm as block styrene peaks, 5.8-5.1 ppm as 1,4-vinyl peaks, and 5.1-4.5 ppm as 1,2-vinyl peaks.

2) Weight Average Molecular Weight (Mw, ×10³ g/Mol), number average molecular weight (Mn, ×10³ g/Mol), Molecular Weight Distribution (PDI, MWD) and Coupling Number (C.N)

By gel permeation chromatography (GPC) analysis, a weight average molecular weight (Mw) and a number average molecular weight (Mn) were measured. In addition, molecular weight distribution (PDI, MWD, Mw/Mn) was calculated from each molecular weight thus measured. Particularly, GPC was conducted using two columns of PLgel Olexis (Polymer Laboratories Co.) and one column of PLgel mixed-C (Polymer Laboratories Co.) in combination, and polystyrene (PS) as a GPC standard material for calculating the molecular weights.

A solvent for measuring GPC was prepared by mixing tetrahydrofuran with 2 wt % of an amine compound.

In addition, a coupling number was obtained by collecting a partial polymer prior to injecting a modifier or a coupling agent in each of the Examples and Comparative Examples, obtaining a peak molecular weight ($Mp_1$) of a polymer, obtaining a peak molecular weight ($Mp_2$) of each modified conjugated diene-based polymer, and calculating by Mathematical Formula 2 below.

Coupling number (C.N)=$Mp_2/Mp_1$  [Mathematical Formula 2]

3) Mooney Viscosity, Mooney Relaxation Ratio (-S/R) and Mooney Large Relaxation Area (MLRA)

The mooney viscosity (MV, (ML1+4, @100° C.) MU) was measured by using MV-2000 (Alpha Technologies Co.) using Large Rotor at a rotor speed of 2±0.02 rpm at 100° C. In this case, a specimen used was stood at room temperature (23±3° C.) for 30 minutes or more, and 27±3 g of the specimen was collected and put in a die cavity, and then, Platen was operated for 4 minutes for measurement.

After measuring the mooney viscosity, the slope value of the change of the mooney viscosity shown while releasing torque was measured, and the mooney relaxation ratio was obtained as the absolute value thereof. In addition, the mooney large relaxation area is an integration value of a mooney relaxation curve from 1 second to 120 seconds after stopping a rotor, and the calculation formula may be represented by Mathematical Formula 1 below.

$$A = \frac{k}{(a+1)}[t_f^{(a+1)} - t_o^{(a+1)}]$$  [Mathematical Formula 1]

In Mathematical Formula 1,

A is a mooney large relaxation area (MLRA), k is a mooney intercept after 1 second from stopping operation of a rotor of a mooney viscometer, a is a mooney relaxation ratio, $t_o$ is an initiation point of mooney relaxation, and $t_f$ is a finishing point of mooney relaxation.

TABLE 1

| | | Example | | | Comparative Example | | | | |
|---|---|---|---|---|---|---|---|---|---|
| Division | | 1 | 2 | 3 | 1 | 2 | 3 | 4 | 5 |
| Modifier | | A + B | A + B | A + B | A | B | C | A + C | B + C |
| NMR (wt %) | SM | 15 | 15 | 15 | 15 | 15 | 15 | 15 | 15 |
| | Vinyl | 25 | 25 | 25 | 25 | 25 | 25 | 25 | 25 |
| GPC | Mw (×10³ g/mol) | 810 | 811 | 829 | 815 | 773 | 726 | 731 | 698 |
| | Mn (×10³ g/mol) | 445 | 436 | 448 | 485 | 433 | 474 | 412 | 411 |
| | PDI | 1.82 | 1.86 | 1.85 | 1.68 | 1.79 | 1.53 | 1.78 | 1.70 |
| | C.N. | 3.40 | 3.36 | 3.31 | 3.21 | 3.42 | 1.66 | 3.00 | 3.00 |
| Mooney viscosity (MV) | | 101.1 | 104.2 | 105.2 | 97.4 | 94.5 | 116.5 | 80.2 | 75.7 |
| -S/R | | 0.2833 | 0.2725 | 0.2781 | 0.4414 | 0.3847 | 0.8847 | 0.5132 | 0.5154 |
| MLRA (MU-s) | | 1789.1 | 2502.5 | 3513.6 | 1326.2 | 987.6 | 599.4 | 1151.9 | 836.8 |

\* Modifier A: N,N'-(cyclohexan-1,3-diylbis(methylene))bis(3-(trimethoxysilyl)-N-(3-(trimethoxysilyl)propyl)propan-1-amine)
\* Modifier B: tris((oxiran-2-ylmethoxy)methyl)amine
\* Modifier C: 3,3'-(1,1,3,3-tetramethoxydisiloxane-1,3-diyl)bis(N,N-diethylpropan-1-amine)

As shown in Table 1, it could be confirmed that the modified conjugated diene-based polymers of Examples 1 to 3 according to embodiments of the present invention had a mooney large relaxation area (MLRA) measured at 100° C. of 1500 MU-s or more. In this case, the modified conjugated diene-based polymers of Examples 1 to 3 showed equal level or greater molecular weights and reduced mooney relaxation ratio (-S/R) values when compared with Comparative Examples 1 to 5.

Experimental Example 2

In order to compare and analyze the physical properties of rubber compositions including the modified conjugated diene-based copolymers prepared in the Examples and Comparative Examples, and molded products manufactured therefrom, processability, tensile properties and viscoelasticity properties were measured, respectively, and the results are shown in Table 3 below.

1) Preparation of Rubber Specimen

Blending was performed using each of the modified or unmodified conjugated diene-based polymers of the Examples and Comparative Examples as a raw material rubber under the compounding conditions shown in Table 2 below. The amounts of the raw materials in Table 2 are represented by parts by weight based on 100 parts by weight of the raw material rubber.

TABLE 2

| Division | Raw material | Amount (parts by weight) |
|---|---|---|
| First stage mulling | Rubber | 100 |
| | Silica | 70 |
| | Coupling agent (X50S) | 11.2 |
| | Process oil | 37.5 |
| | Zinc white | 3 |
| | Stearic acid | 2 |
| | Antioxidant | 2 |
| | Antiaging agent | 2 |
| | wax | 1 |

TABLE 2-continued

| Division | Raw material | Amount (parts by weight) |
|---|---|---|
| Second stage mulling | Sulfur | 1.5 |
| | Rubber accelerator | 1.75 |
| | Vulcanization accelerator | 2 |

Particularly, the rubber specimen was mulled via a first stage mulling and a second stage mulling. In the first stage mulling, a raw material rubber, silica (filler), an organic silane coupling agent (X50S, Evonik), a process oil (TDAE oil), zinc white (ZnO), stearic acid, an antioxidant (TMQ (RD)) (2,2,4-trimethyl-1,2-dihydroquinoline polymer), an antiaging agent (6PPD ((dimethylbutyl)-N-phenyl-phenylenediamine) and wax (Microcrystaline Wax) were mulled using a banbury mixer equipped with a temperature controlling apparatus. In this case, the initial temperature of a mulling apparatus was controlled to 70° C., and after finishing compounding, a first compound mixture was obtained at a discharge temperature of 145° C. to 155° C. In the second stage mulling, the first compound mixture was cooled to room temperature, and the first compound mixture, sulfur, a rubber accelerator (DPG (diphenylguanine)), and a vulcanization accelerator (CZ (N-cyclohexyl-2-benzothiazylsulfenamide)) were added to the mulling apparatus and mixed at a temperature of 100° C. or less to obtain a second compound mixture. Then, via a curing process at 160° C. for 20 minutes, a rubber specimen was formed.

2) Tensile Properties

The tensile properties were measured by manufacturing each specimen and measuring tensile strength when broken and tensile stress when stretched by 300% (300% modulus) of each specimen according to an ASTM 412 tensile test method. Particularly, tensile properties were measured using a Universal Test Machin 4204 tensile tester (Instron Co.) in a rate of 50 cm/min at room temperature.

3) Viscoelasticity Properties

The viscoelasticity properties were secured by measuring viscoelasticity behavior on thermodynamic deformation at each measurement temperature (−60° C.-60° C.) with a frequency of 10 Hz by using a dynamic mechanical analyzer (GABO Co.) in a film tension mode and securing a tan 5 value. From the resultant values, if the tan 5 value at a low temperature of 0° C. increases, wet skid resistance becomes better, and if the tan 5 value at a high temperature of 60° C. decreases, hysteresis loss decreases, and rotation resistance (fuel consumption ratio) becomes better. The resultant values in Table 3 were indexed based on the resultant values of Comparative Example 1, and thus, the higher value means better results.

4) Processability Properties

By measuring the mooney viscosity (MV, (ML 1+4, @100° C.) MU) of the second compound mixture obtained during 1) preparation of rubber specimen, the processability properties of each polymer were compared and analyzed, and in this case, the lower the measured value of the moony viscosity is, the better the processability properties are.

Particularly, by using MV-2000 (Alpha Technologies Co.) using Large Rotor at a rotor speed of 2±0.02 rpm at 100° C., each second compound mixture was stood at room temperature (23±3° C.) for 30 minutes or more, and 27±3 g was collected and put in a die cavity, and then, Platen was operated for 4 minutes for measurement.

TABLE 3

| Division | | Example | | | Comparative Example | | | | |
|---|---|---|---|---|---|---|---|---|---|
| | | 1 | 2 | 3 | 1 | 2 | 3 | 4 | 5 |
| Tensile properties | Tensile strength (kgf/cm²) | 210 | 217 | 216 | 196 | 211 | 187 | 203 | 204 |
| | 300% modulus (kgf/cm²) | 121 | 124 | 119 | 109 | 122 | 105 | 112 | 115 |
| Viscoelasticity properties (index) | tan δ (at 0° C.) | 100 | 100 | 99 | 100 | 100 | 99 | 98 | 102 |
| | tan δ (at 60° C.) | 98 | 99 | 99 | 100 | 78 | 105 | 102 | 87 |
| Processability properties | | 81 | 82 | 84 | 93 | 88 | 107 | 96 | 82 |

As shown in Table 3, Examples 1 to 3 according to embodiments of the present invention showed excellent viscoelasticity properties, tensile properties and processability properties in balance when compared with Comparative Examples 1 to 5. Particularly, Example 1 to Example 3 showed excellent tensile properties, viscoelasticity properties and processability properties overall when compared with Comparative Example 1 to Comparative Example 3, showed markedly improved tensile properties and processability properties when compared with Comparative Example 1 and Comparative Example 3, and markedly improved rotation resistance when compared with Comparative Example 2.

In addition, Example 1 to Example 3 showed excellent tensile properties, viscoelasticity properties and processability properties overall in contrast to Comparative Examples 4 and 5, showed markedly improved tensile properties and processability properties in contrast to Comparative Example 4, and markedly improved tensile properties and rotation resistance when compared with Comparative Example 5. In this case, Comparative Example 1 and Comparative Example 3 are polymers prepared without using an epoxy-based modifier, do not include a functional group derived from an epoxy-based modifier in a molecule, and have a mooney large relaxation area of less than 1500 MU-s, and Comparative Example 2 is a polymer prepared without using an aminoalkoxysilane-based modifier, does not include a functional group derived from an aminoalkoxysilane-based modifier in a molecule, and has a mooney large relaxation area of less than 1500 MU-s. Meanwhile, Comparative Example 4 and Comparative Example 5 are polymers prepared using two types of modifiers but using two types of modifiers which are not the combination of the aminoalkoxysilane-based modifier and the epoxy-based modifier as suggested in the present invention, and have mooney large relaxation areas of less than 1500 MU-s.

From the results of Table 1 to Table 3, it could be confirmed that the modified conjugated diene-based polymer according to the present invention has a high molecular weight and high branching properties, and show a mooney large relaxation area of 1500 MU-s or more, and accordingly, if applied to a rubber composition, may show excellent tensile properties and viscoelasticity properties and markedly improved processability properties.

The invention claimed is:
1. A modified conjugated diene-based polymer having a molecular weight distribution (PDI) of 1.5 to 3.0, and a vinyl content of 10 wt % to 60 wt %,
wherein the modified conjugated diene-based polymer comprises functional groups derived from an amino- alkoxysilane-based modifier and an epoxy-based modifier in at least one terminal, and
wherein the aminoalkoxysilane-based modifier is one or more compounds selected from the group consisting of compounds represented by Formula 2 and Formula 3:

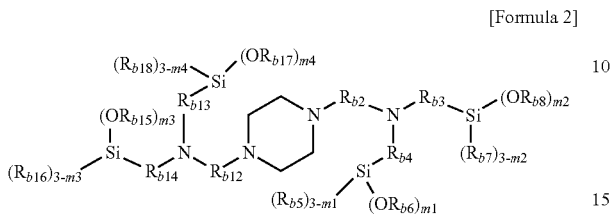
[Formula 2]

in Formula 2,
$R_{b2}$ to $R_{b4}$ are each independently an alkylene group of 1 to 10 carbon atoms,
$R_{b5}$ to $R_{b8}$ are each independently an alkyl group of 1 to 10 carbon atoms,
$R_{b12}$ to $R_{b14}$ are each independently an alkylene group of 1 to 10 carbon atoms,
$R_{b15}$ to $R_{b18}$ are each independently an alkyl group of 1 to 10 carbon atoms, and
$m_1$, $m_2$, $m_3$ and $m_4$ are each independently an integer of 1 to 3,

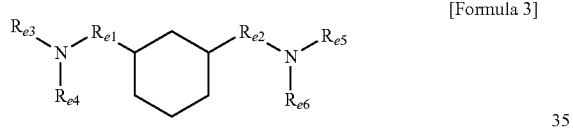
[Formula 3]

in Formula 3,
$R_{e1}$ and $R_{e2}$ are each independently an alkylene group of 1 to 10 carbon atoms,
$R_{e3}$ to $R_{e6}$ are each independently hydrogen, an alkyl group of 1 to 10 carbon atoms or $-R_{e7}SiR_{e8}R_{e9}R_{e10}$, where at least one of $R_{e3}$ to $R_{e6}$ is $-R_{e7}SiR_{e8}R_{e9}R_{e10}$, and $R_{e7}$ is a single bond or an alkylene group of 1 to 10 carbon atoms, and
$R_{e8}$ to $R_{e10}$ are each independently an alkyl group of 1 to 10 carbon atoms or an alkoxy group of 1 to 10 carbon atoms, where at least one of $R_{e8}$ to $R_{e10}$ is an alkoxy group of 1 to 10 carbon atoms.

2. The modified conjugated diene-based polymer of claim 1, wherein the aminoalkoxysilane-based modifier is represented by Formula 3.

3. The modified conjugated diene-based polymer of claim 1, wherein the epoxy-based modifier is one or more compounds selected from the group consisting of compounds represented by Formula 4 to Formula 7:

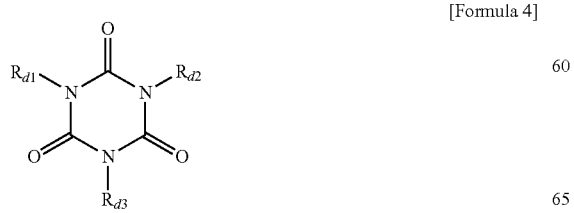
[Formula 4]

in Formula 4,
$R_{d1}$ to $R_{d3}$ are each independently hydrogen, an alkyl group of 1 to 10 carbon atoms or $-R_{d4}R_{d5}$, where at least one of $R_{d1}$ to $R_{d3}$ is $-R_{d4}R_{d5}$, $R_{d4}$ is an alkylene group of 1 to 10 carbon atoms, which optionally includes a heteroatom, and $R_{d5}$ is an epoxy group,

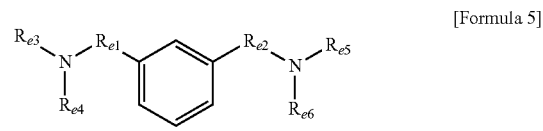
[Formula 5]

in Formula 5,
$R_{e1}$ and $R_{e2}$ are each independently an alkylene group of 1 to 10 carbon atoms, and
$R_{e3}$ to $R_{e6}$ are each independently hydrogen, an alkyl group of 1 to 10 carbon atoms or $-R_{e7}R_{e8}$, where at least one of $R_{e3}$ to $R_{e6}$ is $-R_{e7}R_{e8}$, $R_{e7}$ is an alkylene group of 1 to 10 carbon atoms, which optionally includes one or more heteroatoms selected from N, S and O, and $R_{e8}$ is an epoxy group,

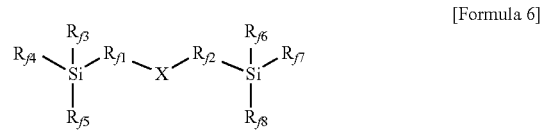
[Formula 6]

in Formula 6,
X is O or S,
$R_{f1}$ and $R_{f2}$ are each independently a single bond, or an alkylene group of 1 to 10 carbon atoms, and
$R_{f3}$ to $R_{f8}$ are each independently hydrogen, an alkyl group of 1 to 15 carbon atoms, an alkoxy group of 1 to 10 carbon atoms, an aryl group of 6 to 10 carbon atoms, a cycloalkyl group of 5 to 10 carbon atoms, an aralkyl group of 7 to 14 carbon atoms or $-R_{f9}R_{f10}$, where at least one of $R_{f3}$ to $R_{f8}$ is $-R_{f9}R_{f10}$, $R_{f9}$ is an alkylene group of 1 to 12 carbon atoms, which optionally includes a heteroatom, and $R_{f10}$ is an epoxy group,

[Formula 7]

in Formula 7,
$R_{g1}$ to $R_{g4}$ are each independently hydrogen, an alkyl group of 1 to 10 carbon atoms, an alkoxy group of 1 to 10 carbon atoms, an aryl group of 6 to 12 carbon atoms or $-R_{g5}OR_{g6}$, where at least one of $R_{g1}$ to $R_{g4}$ is $-R_{g5}OR_{g6}$, $R_{g5}$ is a single bond or an alkylene group of 1 to 10 carbon atoms, and $R_{g6}$ is an epoxyalkyl group of 3 to 10 carbon atoms, and
Y is C or N, where if Y is N, $R_{g4}$ is not present.

4. The modified conjugated diene-based polymer of claim 1, wherein the modified conjugated diene-based polymer has a number average molecular weight (Mn) of 100,000 g/mol to 2,000,000 g/mol, and a weight average molecular weight (Mw) of 100,000 g/mol to 3,000,000 g/mol.

5. The modified conjugated diene-based polymer of claim 1, wherein the conjugated diene-based polymer is a homopolymer of a conjugated diene-based monomer; or a copolymer of a conjugated diene-based monomer and an aromatic vinyl-based monomer.

6. The modified conjugated diene-based polymer of claim 3, wherein the compound represented by Formula 4 is a compound represented by Formula 4-1:

[Formula 4-1]

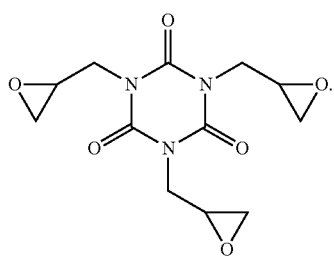

7. The modified conjugated diene-based polymer of claim 3, wherein the compound represented by Formula 5 is a compound represented by Formula 5-1:

[Formula 5-1]

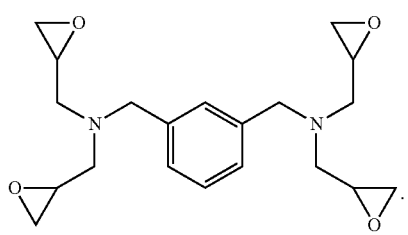

8. The modified conjugated diene-based polymer of claim 3, wherein the compound represented by Formula 6 is a compound represented by Formula 6-1 or Formula 6-2:

[Formula 6-1]

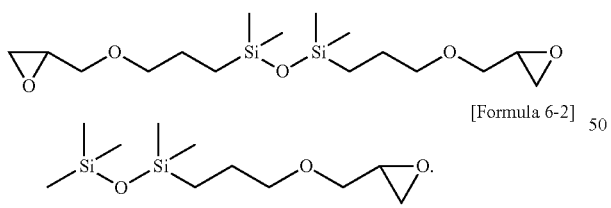

[Formula 6-2]

9. The modified conjugated diene-based polymer of claim 3, wherein the compound represented by Formula 7 is selected from the compounds represented by Formula 7-1 to Formula 7-4:

[Formula 7-1]

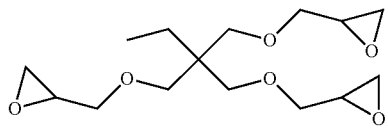

[Formula 7-2]

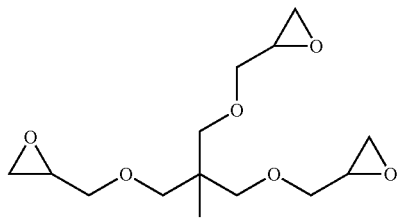

[Formula 7-3]

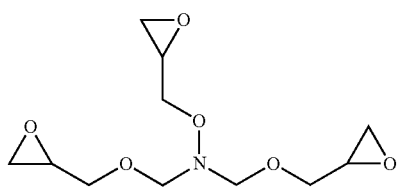

[Formula 7-4]

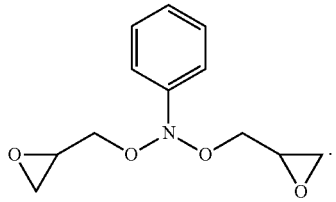

10. The modified conjugated diene-based polymer of claim 1, which has a mooney relaxation ratio measured at 100° C. of 0.5 or less, and 0.1 or more.

11. The modified conjugated diene-based polymer of claim 1, which has a mooney viscosity at 100° C. of 70 or more.

12. A method for preparing a modified conjugated diene-based polymer having a molecular weight distribution (PDI) of 1.5 to 3.0, and a vinyl content of 10 wt % to 60 wt %,
wherein the modified conjugated diene-based polymer comprises functional groups derived from an aminoalkoxysilane-based modifier and an epoxy-based modifier in at least one terminal, and
wherein the aminoalkoxysilane-based modifier is one or more compounds selected from the group consisting of compounds represented by Formula 2 and Formula 3:

[Formula 2]

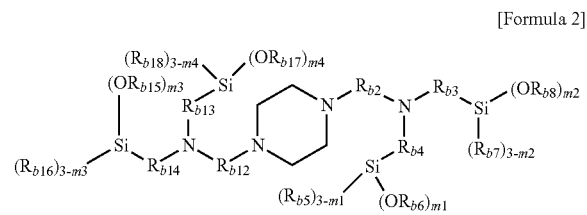

in Formula 2,
$R_{b2}$ to $R_{b4}$ are each independently an alkylene group of 1 to 10 carbon atoms,
$R_{b5}$ to $R_{b8}$ are each independently an alkyl group of 1 to 10 carbon atoms,
$R_{b12}$ to $R_{b14}$ are each independently an alkylene group of 1 to 10 carbon atoms,
$R_{b15}$ to $R_{b18}$ are each independently an alkyl group of 1 to 10 carbon atoms, and
$m_1$, $m_2$, $m_3$ and $m_4$ are each independently an integer of 1 to 3,

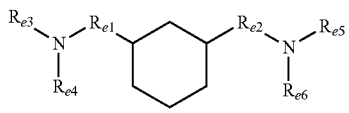

[Formula 3]

in Formula 3, $R_{e1}$ and $R_{e2}$ are each independently an alkylene group of 1 to 10 carbon atoms, $R_{e3}$ to $R_{e6}$ are each independently hydrogen, an alkyl group of 1 to 10 carbon atoms or $—R_{e7}SiR_{e8}R_{e9}R_{e10}$, where at least one of $R_{e3}$ to $R_{e6}$ is $—R_{e7}SiR_{e8}R_{e9}R_{e10}$, and $R_{e7}$ is a single bond or an alkylene group of 1 to 10 carbon atoms, and $R_{e8}$ to $R_{e10}$ are each independently an alkyl group of 1 to 10 carbon atoms or an alkoxy group of 1 to 10 carbon atoms, where at least one of $R_{e8}$ to $R_{e10}$ is an alkoxy group of 1 to 10 carbon atoms, the method comprising:

step (S1): polymerizing a monomer mixture of a conjugated diene-based monomer, or an aromatic vinyl-based monomer and a conjugated diene-based monomer in the presence of a polymerization initiator in a hydrocarbon solvent to prepare an active polymer; and step (S2): reacting or coupling the active polymer prepared in the step S1 with a first modifier and a second modifier, wherein the first modifier is the aminoalkoxysilane-based modifier, and the second modifier is the epoxy-based modifier.

13. The method of claim 12, wherein the polymerization initiator is used in 0.01 mmol to 10 mmol based on 100 g of the monomer mixture.

14. The method of claim 12, wherein the first modifier and the second modifier are injected in order or in batch to react or couple with the active polymer, and the first modifier and the second modifier are used in a molar ratio of 10:1 to 5:1.

15. The method of claim 12, wherein the total amount of the first modifier and the second modifier is 0.01 mmol to 10 mmol based on total 100 g of the monomer mixture.

16. A rubber composition comprising the modified conjugated diene-based polymer described in claim 1, and a filler.

17. The rubber composition of claim 16, wherein the rubber composition comprises 0.1 parts by weight to 200 parts by weight of the filler based on 100 parts by weight of the modified conjugated diene-based polymer.

* * * * *